US012078307B2

(12) United States Patent
Schug et al.

(10) Patent No.: US 12,078,307 B2
(45) Date of Patent: Sep. 3, 2024

(54) LED RETROFIT LAMP FOR USE IN PROJECTOR TYPE AUTOMOTIVE HEADLIGHT SYSTEM

(71) Applicant: LUMILEDS LLC, San Jose, CA (US)

(72) Inventors: Josef Andreas Schug, Würselen (DE); Benno Spinger, Aachen (DE); Lukas Kuepper, Aachen (DE); Jean-Sebastien Straetmans, Aachen (DE)

(73) Assignee: LUMILEDS LLC, San Jose, CA (US)

( * ) Notice: Subject to any disclaimer, the term of this patent is extended or adjusted under 35 U.S.C. 154(b) by 16 days.

(21) Appl. No.: 18/192,427

(22) Filed: Mar. 29, 2023

(65) Prior Publication Data

US 2023/0324020 A1 Oct. 12, 2023

Related U.S. Application Data

(60) Provisional application No. 63/325,383, filed on Mar. 30, 2022.

(51) Int. Cl.
*F21S 41/141* (2018.01)
*F21S 41/19* (2018.01)
(Continued)

(52) U.S. Cl.
CPC .......... *F21S 41/141* (2018.01); *F21S 41/192* (2018.01); *F21S 41/25* (2018.01); *F21V 19/003* (2013.01); *F21Y 2115/10* (2016.08)

(58) Field of Classification Search
CPC ................ F21Y 2115/10; F21S 41/003; F21S 41/192; F21S 41/25; F21S 41/141
See application file for complete search history.

(56) References Cited

U.S. PATENT DOCUMENTS 9,933,125 B2 4/2018 Kuo
10,415,787 B2 9/2019 Lessard et al.
(Continued)

FOREIGN PATENT DOCUMENTS

CN 208349200 1/2019
CN 112984460 A * 6/2021 .............. F21K 9/23
(Continued)

OTHER PUBLICATIONS

Innovation Q+ NPL search (Year: 2023).*
International Search Report and Written Opinion dated Jun. 16, 2023 for PCT International Application No. PCT/US2023/016930.

*Primary Examiner* — Anabel Ton
(74) *Attorney, Agent, or Firm* — Volpe Koenig

(57) ABSTRACT

An LED retrofit lamp for a projection headlight system comprises a heat dissipating body portion and a substantially rectangular substrate. A first LED group is mounted on a first surface of the substrate and a second LED group is mounted on a second surface. A support bracket is configured to engage longitudinal sides of the substrate to mechanically support the substrate in alignment with a central optical axis of the headlight system so that light emitted by the first and second LED groups parallel to the first and second surfaces illuminates corresponding top and bottom segments of a cooperating reflector with sufficient intensity for projection headlight system to form a beam having substantially homogenous light intensity.

20 Claims, 7 Drawing Sheets

(51) Int. Cl.

| | |
|---|---|
| ***F21S 41/25*** | (2018.01) |
| ***F21V 19/00*** | (2006.01) |
| *F21Y 115/10* | (2016.01) |

(56) References Cited

U.S. PATENT DOCUMENTS

| | | | |
|---|---|---|---|
| 10,883,711 | B1 | 1/2021 | Xie |
| 2022/0341561 | A1 | 10/2022 | Xie |

FOREIGN PATENT DOCUMENTS

| | | | | | |
|---|---|---|---|---|---|
| CN | 113623608 | A | * | 11/2021 | ............... F21K 9/90 |
| DE | 202018000609 | U1 | * | 5/2018 | ............ F21S 41/141 |
| DE | 102019219943 | | | 6/2021 | |
| JP | 2015-207512 | | | 11/2015 | |
| JP | 2018-022616 | | | 2/2018 | |
| WO | WO-2018162341 | A1 | * | 9/2018 | ............... F21K 9/23 |

* cited by examiner

FIG. 9A
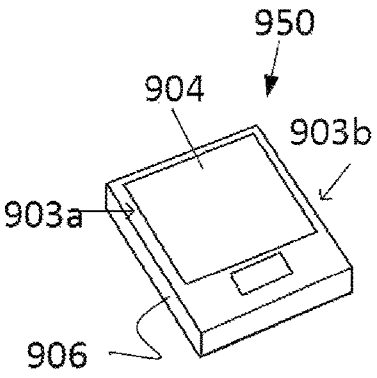
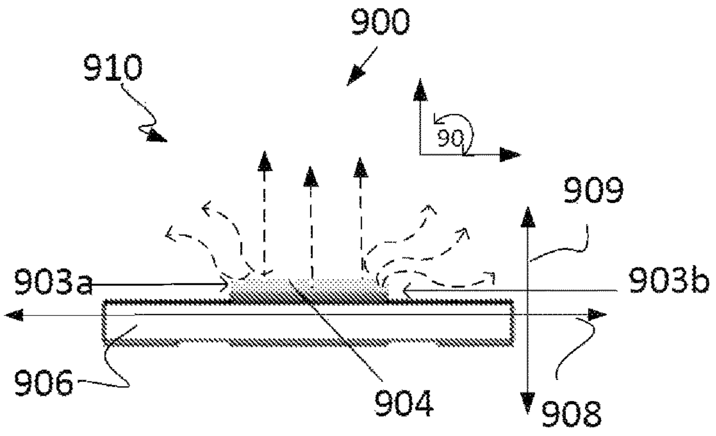
FIG. 9B
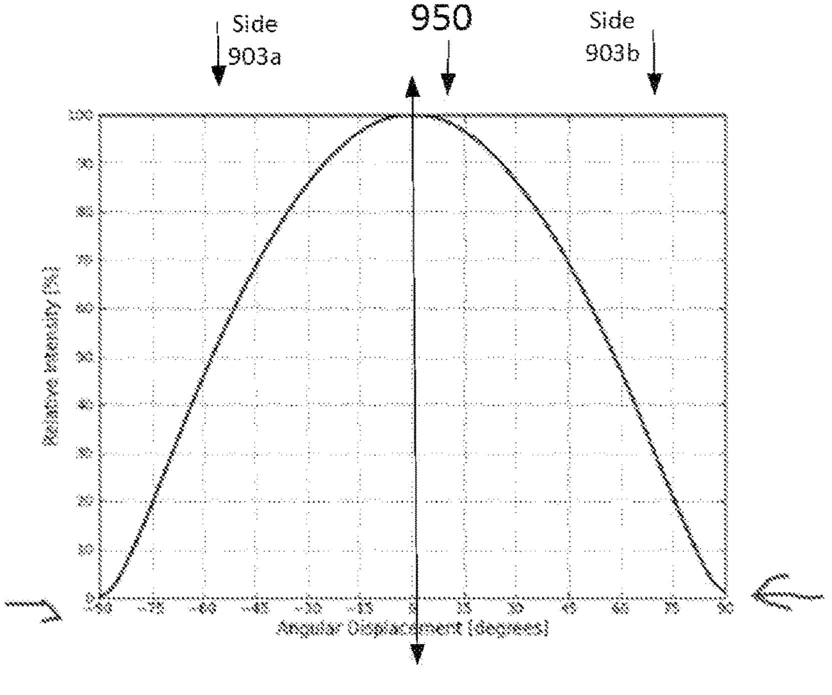
FIG. 9C

LED RETROFIT LAMP FOR USE IN PROJECTOR TYPE AUTOMOTIVE HEADLIGHT SYSTEM

This application claims the benefit of U.S. Application Ser. No. 63/325,383, filed Mar. 30, 2022, which is incorporated by reference as if fully set forth

BACKGROUND

Light Emitting Diode (LED) retrofit lamps can be used as aftermarket replacements for halogen lamps in automotive headlight systems. The term LED retrofit may generally refer to an LED lamp assembly providing a headlamp illumination function formerly provided by a halogen lamp. In such retrofit lamps, the LEDs may be placed at a position close to the position where the filament would be in a halogen lamp. In many retrofit lamps, two groups of LEDs may be placed on opposite sides of a printed circuit board (PCB). When used in an automotive headlight system, the groups of LEDs may be projected, and ideally the projected outline of the group of LEDs may coincide with the projected contour of the filament when viewed normal to the top surface of the LEDs. The light of emissions of such groups of LEDs may ideally be back to back.

SUMMARY

An LED retrofit lamp for a projection headlight system includes a heat dissipating body portion and a substantially rectangular substrate. A first LED group is mounted on a first surface of the substrate and a second LED group is mounted on a second surface. A support bracket is configured to engage longitudinal sides of the substrate to mechanically support the substrate in alignment with a central optical axis of the headlight system so that light emitted by the first and second LED groups parallel to the first and second surfaces illuminates corresponding top and bottom segments of a cooperating reflector with sufficient intensity for projection headlight system to form a beam having substantially homogenous light intensity.

BRIEF DESCRIPTION OF THE DRAWINGS

A more detailed understanding can be had from the following description, given by way of example in conjunction with the accompanying drawings wherein:

FIG. 9A is a perspective pictorial view of another example LED package;

FIG. 9B is a pictorial side elevation view of the example LED package of FIG. 9A; and FIG. 9C is a luminous intensity diagram of the example LED package of FIG. 9A.

DETAILED DESCRIPTION

Figure 1:
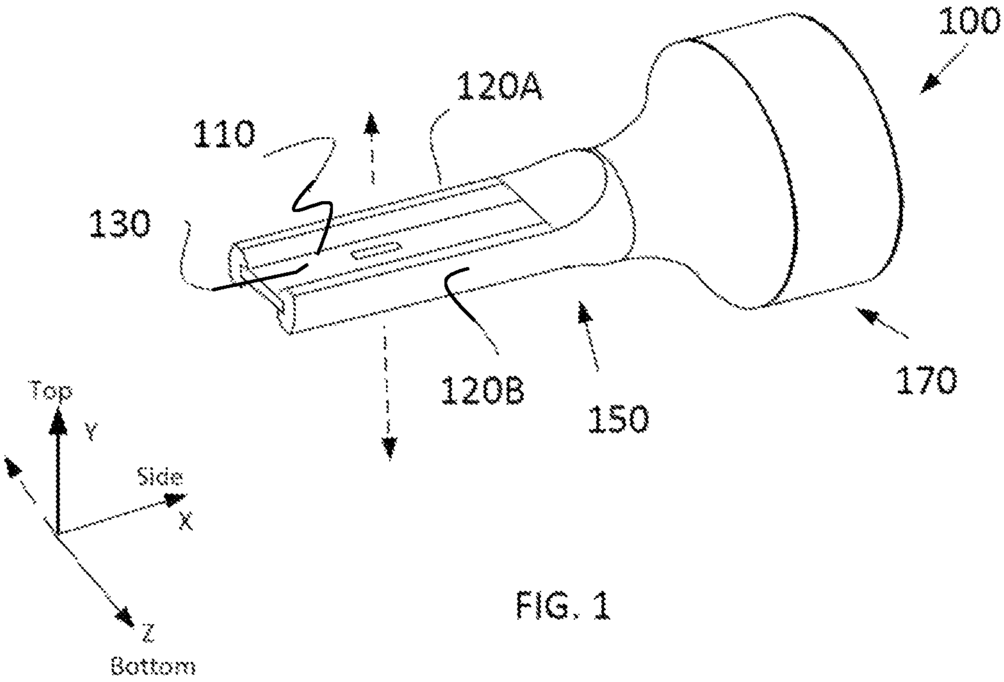
FIG. 1 is a perspective view of an example LED retrofit lamp.

Examples of different light illumination systems and/or light emitting diode (LED) implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

LED retrofits are popular as aftermarket replacements for halogen lamps in both reflector and projector type automotive headlight systems. The term LED retrofit may generally refer to an LED lamp assembly providing a headlamp illumination function formerly provided by a halogen lamp. The mounting structure of an LED retrofit lamp is configured to be compatible with a mounting structure for a corresponding halogen type lamp.

Ideally, the profile of the light emitted by an LED retrofit lamp will replicate that of the corresponding halogen lamp. However, a glowing filament in a halogen lamp emits light in all directions with virtually no dark space at the point of emission. In contrast, the LED light emitters in LED retrofit lamps are typically mounted on a side of a printed circuit board. Thus, the emitted light may not have a profile that ideally matches that of a filament in a halogen lamp. For example, the LED lamp may emit light from one side of the circuit board and not the other. Whether the LED retrofit lamp is placed in a reflector or a projector type headlamp system, the one-sided light emission profile can negatively impact performance of the headlamp.

FIG. 1 is a perspective view of an example LED retrofit lamp 100. In the example illustrated in FIG. 1, the LED retrofit lamp 100 includes a heat sink body portion 170 and a bracket 150. The bracket 150 may provide mechanical support and stabilization to a substrate 130. The substrate 130 may be or include a printed circuit board (PCB). The bracket 150 may include an elongated first bracket arm 120A and an elongated second bracket arm 120B extending from the heat sink body portion 170 to define a longitudinal axis of the LED retrofit lamp 100. A cap portion (not labeled) may join the first and second bracket arms at a proximal end of bracket 150 and may couple bracket 150 to heat sink body portion 140. The cap portion can be a separate piece or part of the heat sink body portion and/or the bracket 150.

The substrate 130 may be generally rectangular in shape and disposed between the first and second bracket arms 120A and 120B. A first longitudinal edge (not visible in FIG. 1) of the substrate 130 may engage a corresponding slot formed in the bracket arm 120A. A second longitudinal edge (not visible in FIG. 1) of the substrate 130 may engage a corresponding slot formed in the bracket arm 120B.

A first LED package 110 may include a first group of light emitters and may be mounted on one side of the substrate 130. A second LED package (not visible in FIG. 1) may include a second group of light emitters and may be mounted on the opposite side of substrate 130 (not visible in FIG. 1). The LED packages may be arranged on the substrate 130 so as to emit light from about the same position within the LED retrofit lamp 100 as a filament would be positioned in a corresponding halogen lamp. Light may be emitted from both sides of substrate 130 from side to side as indicated by the dashed arrow in FIG. 1.

The LED packages 110 may be mounted on respective sides of the substrate 130 such that, when mounted, their non-light-emitting surfaces may be essentially back to back with the substrate 130 interposed between them. Ideally, when the LED retrofit lamp 100 is installed in a vehicle headlamp system, the projected outline of the first and second group of LEDs in the back to back arrangement may coincide with the projected contour of the filament in the corresponding halogen lamp when viewed normal to the top surfaces of the LEDs.

Figure 2:
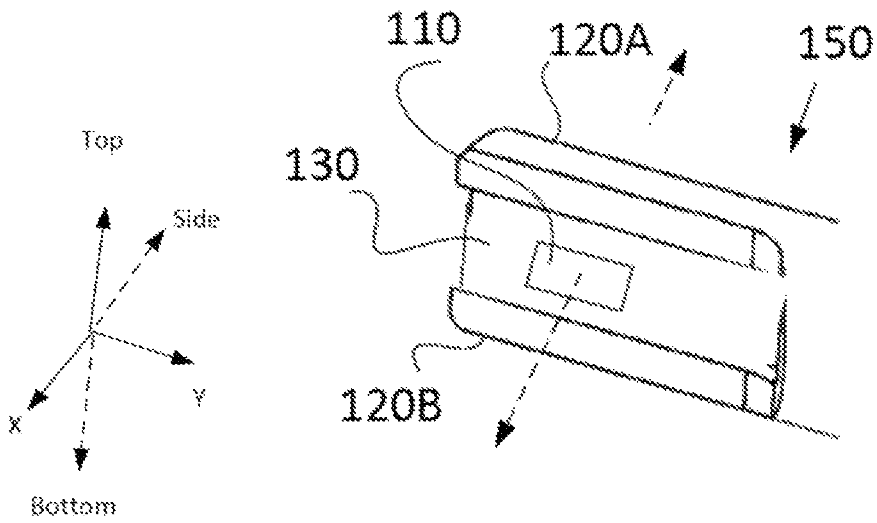
FIG. 2 is a perspective view of a distal portion of the example LED retrofit lamp of FIG. 1.

FIG. 2 is a side elevation view of a distal portion of the bracket 150 of the LED retrofit lamp 100 illustrated in FIG. 1. The bracket 150 may support the substrate 130 in a central region of a reflector structure (not shown in FIG. 2), which can include, for example, a reflector type vehicle headlight system (complete system not shown). FIG. 1 illustrates an orientation of the bracket 150, and, thus, an orientation of a main light emitting surface of the LED packages 110, on opposite sides of substrate, with respect to ground, when viewed as installed in a headlight system (not shown) of a vehicle in a typical operating orientation with the wheels of the vehicle resting on the ground.

In the orientation shown in FIG. 2, a vehicle floor would define 'down,' and a vehicle roof would define 'up'. Accordingly, 'bottom' or 'downward' is toward the vehicle floor and lop' or 'upward' is toward the vehicle roof. In this orientation, the main light emitting surfaces of the back to back LED packages 110 may emit light in opposite directions from opposite sides of the substrate 130. The light may be emitted from the respective substrate sides in a direction that would correspond to sides of a vehicle where, for example, the driver side door would define one side of the vehicle and the passenger side door would define the other side of the vehicle. In this orientation, a substantial portion of the light emitted from the LED packages 100 may be emitted sideways (i.e., in a direction horizontal to the ground plane).

As seen in FIG. 2, the bracket 150 may maintain a position of the substrate 130 within a central region of a reflector structure (not shown in FIG. 2). The reflector structure can be part of a vehicle headlamp system (not shown). Light emitted from the main light emitting surfaces of the LED packages 110 may mainly be emitted in the direction shown by arrows the dashed arrow, which is toward corresponding segments of the reflector, which may be on opposite sides of the reflector structure and may be close to a horizontal plane in which the optical system including the headlamp system lies (e.g., a plane horizontal to the plane of top and bottom surfaces of the substrate 130).

Configurations, such as the one illustrated in FIG. 2, may perform particularly well in reflector type headlamp systems. In such headlamp systems, the essential parts of the headlight beam may be created by reflector segments close to the horizontal plane of the optical system. These segments may cooperate to create a smooth beam with a good range in the important part of the headlight beam, which is about 25 m to 100 m in front of the vehicle. On the other hand, the reflector segments above and below the retrofit lamp 100 may make only a limited contribution to headlight beam-forming in reflector type headlight systems. In such configurations, it may be acceptable that the first and second groups of LED emitters do not emit light towards the top and bottom reflector segments. This emission pattern can even be beneficial, in that more light may be emitted towards the relevant horizontal reflector segments.

Figure 3:
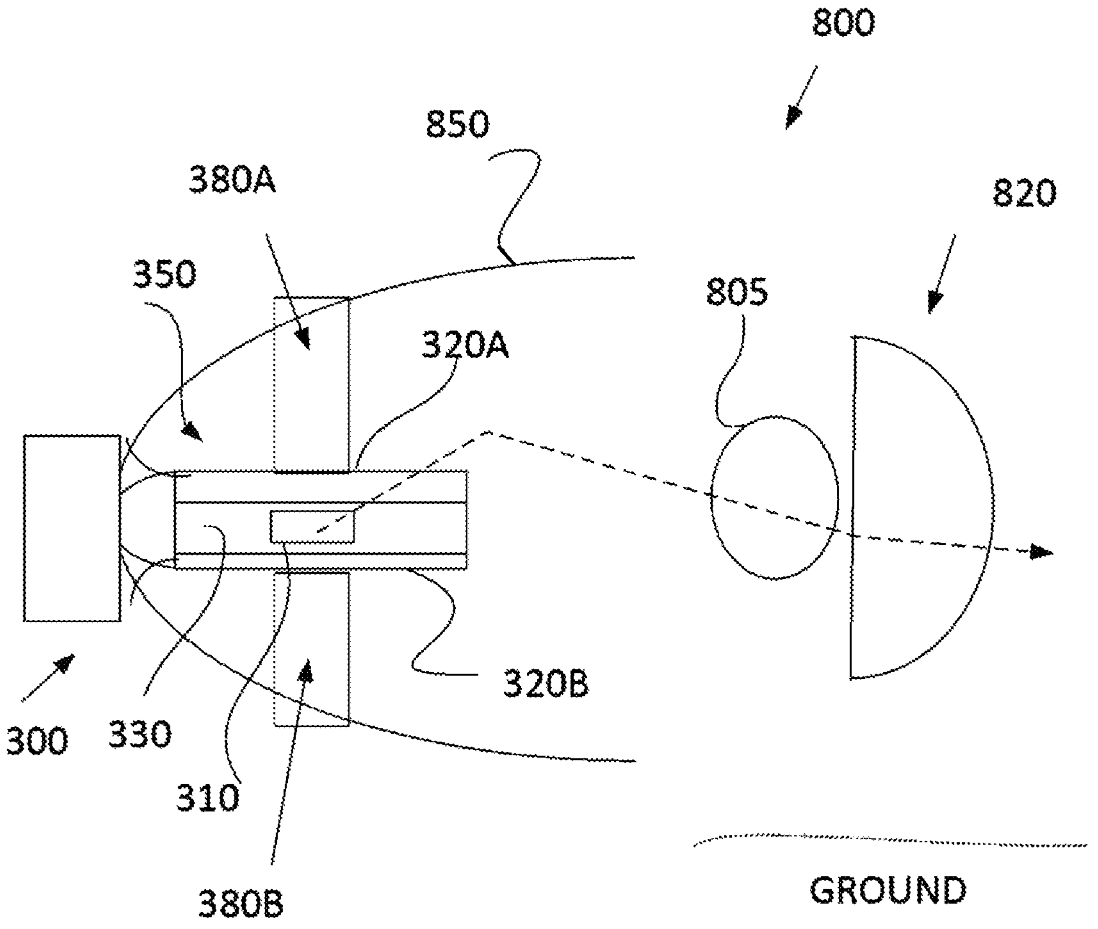
FIG. 3 is side elevation view of the example LED retrofit lamp of FIGS. 1 and 2 disposed within a projector headlamp system.

FIG. 3 is a side elevation view of the LED retrofit lamp 100 shown in FIGS. 1 and 2 as seen disposed within a projector type vehicle headlamp system 800. In this view, the elevation is vertical (top to bottom) normal to the horizontal ground plane. Like a reflector type headlamp system, a projector type headlamp system 800 includes a reflector structure 850. The projector headlamp system 800 may further include a lens 820.

As described above with respect to FIG. 2, the main light emitting surfaces of the LED packages 110 may emit light from their respective sides of the substrate 130 toward respective corresponding opposite reflector segment sides (not shown) of the reflector 850. The reflector 850 may reflect light (indicated by the dashed arrow in FIG. 3) toward a focal area 805. A lens 820 may collect light from the focal area to form the headlight beam and project the headlight beam outward from the front of the vehicle. Unlike the reflector type headlamp system, in a projector type headlamp system, such as the projector type headlamp system 800 of FIG. 3, a lack of light towards the top and bottom segments of the reflector 850 can translate to inhomogeneities in the light comprising the headlight beam projected outward in front of the vehicle, particularly in the central region of the beam.

The performance of the optical system in a projector type headlight system may also be affected by the distance by which the LED emitters on both sides of the substrate are displaced from the nominal filament position. The greater the apparent separation between the backs of the back to back LED packages, the further each chip may be displaced from the nominal filament position. For that reason, it may be desirable to form the substrate 130 to be as thin as possible. The thinner the substrate interposed between the backs of the back to back LED packages, the closer to each other are the backs of the LED packages and the closer each chip is to the nominal filament position.

On the other hand, if the substrate 130 is too thin, it may not provide sufficient mechanical stability when the LED packages 110 are mounted on substrate 130. Thus, LED brackets, such as the bracket 150 illustrated in FIGS. 1 and 2, may be provided to mechanically support and stabilize the substrate to which the LED packages 110 may be mounted. To securely engage and support the edges of the substrate between the bracket arms of the bracket, the bracket arms should have a width that is wider than the thickness of the substrate. This can be seen in FIG. 1 in which the substrate is disposed between the bracket arms by engaging the edges of the substrate with a slot that extends along a longitudinal axis of each bracket arm. The portions of each of the bracket arms above and below the corresponding slots make the width of the bracket arms wider than the thickness of the substrate.

As discussed above, the greater the separation between the backs of the back to back LED packages 110, the further are the LED packages from the nominal filament position. Decreasing the thickness of the substrate may decrease the actual separation distance between the backs of the LED packages 110. However, the width of the bracket arms themselves may increase an apparent distance between the backs of the back to back LEDs when the emitted light is viewed looking down at the bracket from above the bracket (i.e., in a top plan view of bracket 150).

Due to the thickness of the first and second bracket arms, light emitted under small angles relative to the top surface of the groups of LEDs comprising the LED packages 110 can be blocked by portions of the bracket arms. In that case, the bracket arms may create a zone with no or very little light intensity that is larger than would be created by the substrate itself without the bracket. Therefore, the performance of LED retrofit light sources in projector systems may be impaired by the bracket that supports substrate 130.

Figure 4:
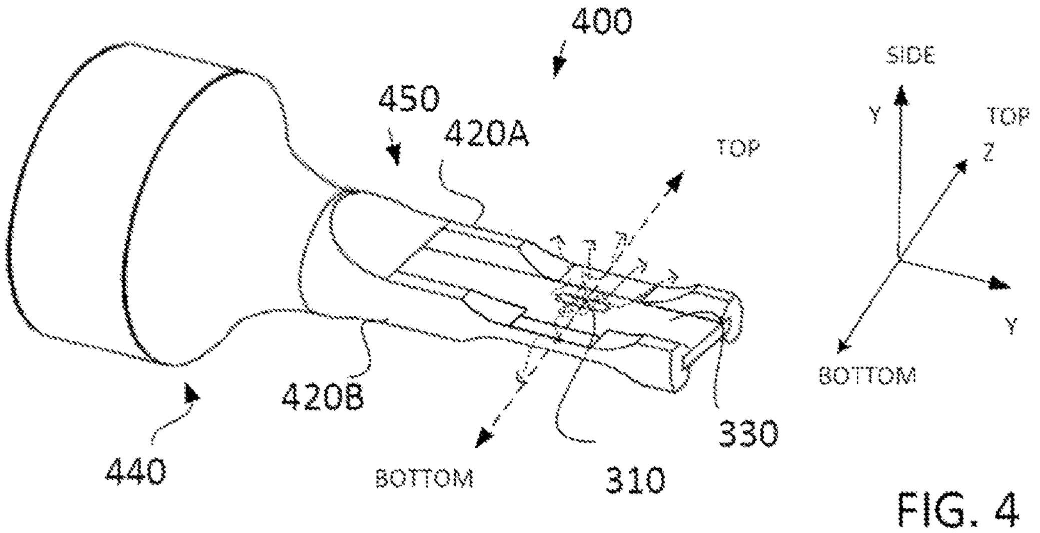
FIG. 4 is a perspective view of another example LED retrofit lamp.

FIG. 4 is a perspective view of an example of an LED retrofit lamp 400. In the example illustrated in FIG. 4, the LED retrofit lamp 400 includes a heat sink body portion 440 and a bracket 450 configured to support a substrate 330. In the examples herein, the substrate 330 can be or include a printed circuit board (PCB). A first LED package 310, which may include a first group of LED light emitters (not individually depicted) may be mounted on one side of substrate 330. A second LED package 310 (not visible in FIG. 4) may be mounted on the other side of substrate 330 (not visible in FIG. 4). The first and second LED packages 310 may be mounted back to back. In that arrangement, the substrate 330 may separate the back of the first LED package 310 from the back of the second LED package 310 by an actual distance that is substantially equal to the thickness of substrate 330.

The bracket 450 may include a first elongated bracket arm 420A and a second elongated bracket arm 420B extending from a cap portion between the bracket 450 and heat sink body portion 440 (not labeled in FIG. 4) to define a longitudinal axis of the LED retrofit lamp 400. As mentioned above, the cap may couple the bracket 450 to the heat sink body 440. Unlike the bracket 150 of the LED retrofit lamp 100, the bracket 450 of LED retrofit lamp 400 may be configured in accordance with the teachings herein to improve the performance of the LED retrofit lamp 400 compared to the LED retrofit lamp 100 when performance is compared in a projector type headlight system.

In the configuration of the example shown in FIG. 4, light 22 emitted by the LED packages 310 propagates outwardly through an intermediate portion of the bracket 450 between proximal and distal portions of the first and second bracket arms. This light may be emitted upwards and downwards. In projector type headlight systems, the light emitted upwards or downwards can have a more important contribution to the beam pattern. The configuration of FIG. 4 provides more light towards these parts of the optical system, which mitigates the problem of inhomogeneities in the projected beam pattern, particularly in the central part.

The performance of these parts of the optical system may also be affected by the distance of the LEDs from the nominal filament position (i.e., the distance of the top light emitting areas of the two groups of LEDs). Accordingly, the configuration of FIG. 4 maintains an apparent separation between the backs of back to back LED packages 310 that is substantially the same as the actual separation. The actual separation may be the distance between the backs of the back to back LED packages that corresponds to the thickness of the substrate 330 interposed between the backs of LED packages 310. The smaller the separation between the LED packages, whether apparent or actual separation, the closer the profile of the light emitted by the LED packages of lamp 400 to the profile of light emitted by a filament of a corresponding halogen lamp.

Figure 5:
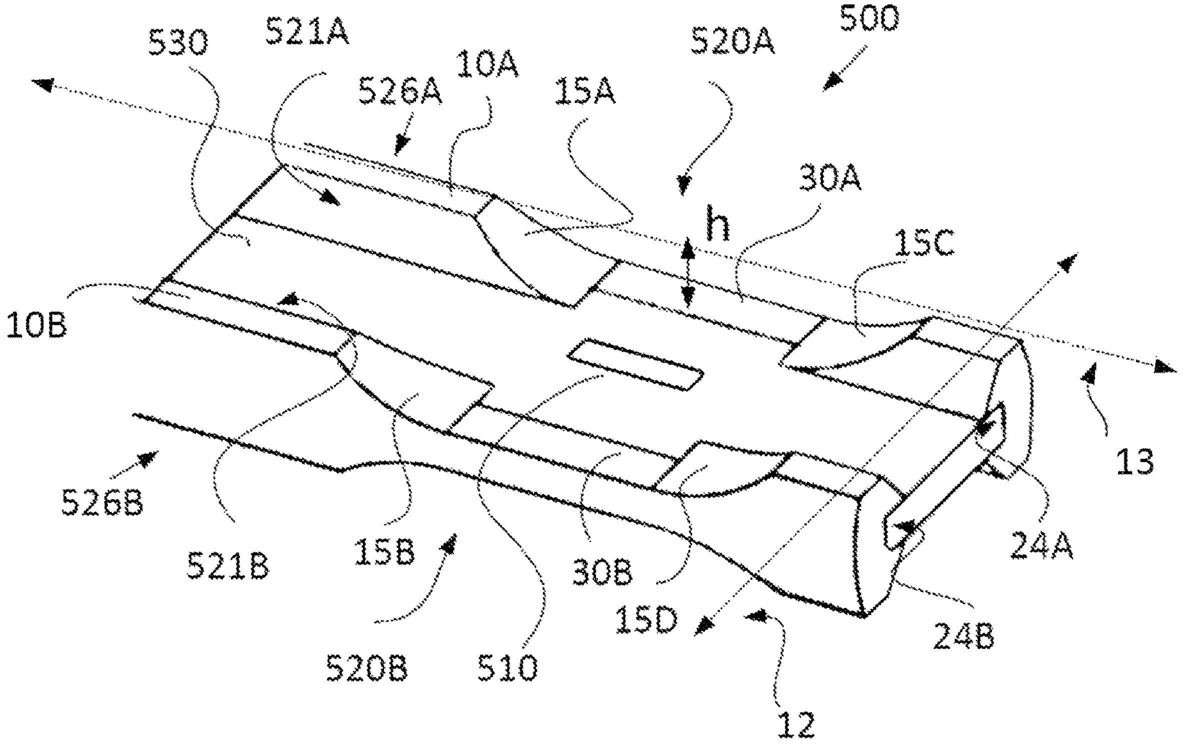
FIG. 5 is enlarged view of a portion of the example LED retrofit lamp of FIG. 4.

FIG. 5 is an enlarged perspective view of the bracket shown in FIG. 4. As shown in FIG. 5, the bracket 500 includes a first (upper) bracket arm 520A and a second (lower) bracket arm 520B. The bracket 450 may engage the substrate 530 at corresponding proximal and distal longitudinal edges of the substrate 530.

The first bracket arm 520A and the second bracket arm 520B may each include a proximal end 526A and 526B, a distal end and an intermediate portion. In the example, the proximal edges of the substrate 530 are engaged with corresponding slots 24A and 24B formed in the proximal and distal portions of the first and second bracket arms 520A and 520B. Each slot may extend along a longitudinal axis 13 of the corresponding proximal and distal portions of first and second bracket arms 520A and 520B.

Intermediate portions 30A and 30B may extend between the proximal portions of the bracket arms 520A and 520B and the distal portions of bracket arms 520A and 520B. The proximal portions of bracket arms 520A and 520B may each include a curved section 15A, 15B that may connect to corresponding proximal ends of intermediate portions 30A and 30C. Likewise, distal portions of bracket arms 520A and 520B may each include a curved section 15C and 15D that may connect to distal ends of intermediate portions 30A and 30B. Intermediate portions 30A and 30B of first and second bracket arms 520A and 520B may have a height that is substantially the same as the thickness of substrate 530. In this way, the bracket arms 520A and 520B, which may have a maximum height h defined by a top surface 10A and 10B of the bracket arms 520A and 520B, will not block light emitted from the LEDs 510 in the lateral direction 12.

Intermediate portions 30A and 30B may contact corresponding intermediate longitudinal edges of the substrate 530 at a corresponding intermediate portion of the substrate 530.

Because the intermediate portions in this area of the bracket arms may have the same height as the substrate thickness, the bracket arms in the intermediate portions may not project above the top surface of substrate 530 or below the bottom surface of substrate 530. Consequently, the apparent separation between the backs of back to back LED packages 510 may be substantially the same as the actual separation, which is the thickness of substrate 530 in the region of intermediate portions 30A and 30B. This may provide an illumination profile for the LED retrofit lamp 500 that is closer to that of a filament in a corresponding halogen lamp when compared to the illumination profile provided by the bracket 150 of the retrofit lamp 100.

Curved sections 15A, 15B, 15C and 15D on both the top and bottom surfaces of each bracket arm may form light-shaping openings through which light emitted by the LED packages 510 may pass close to the plane of the top and bottom surfaces of substrate 530. Bracket arms 520A and 520B may be configured with respect to the LED packages 510 and substrate 530 such that the light-shaping openings may align with light emitting portions at the sides of LED packages 510. When the LED retrofit lamp 500 is installed in a headlamp system of a vehicle, the light-shaping openings in the bracket arms may be at the top and bottom of the LED retrofit lamp 500. Light may propagate through the light-shaping openings to illuminate corresponding top and bottom segments of the reflector 800.

The bracket configuration described in detail above may provide an improved headlight beam when the LED retrofit lamp 500 is installed in a projector type headlight system in comparison to a headlight beam provided by, for example, the LED retrofit 100 shown in FIG. 1 installed in a projector type headlight system.

Figure 6:
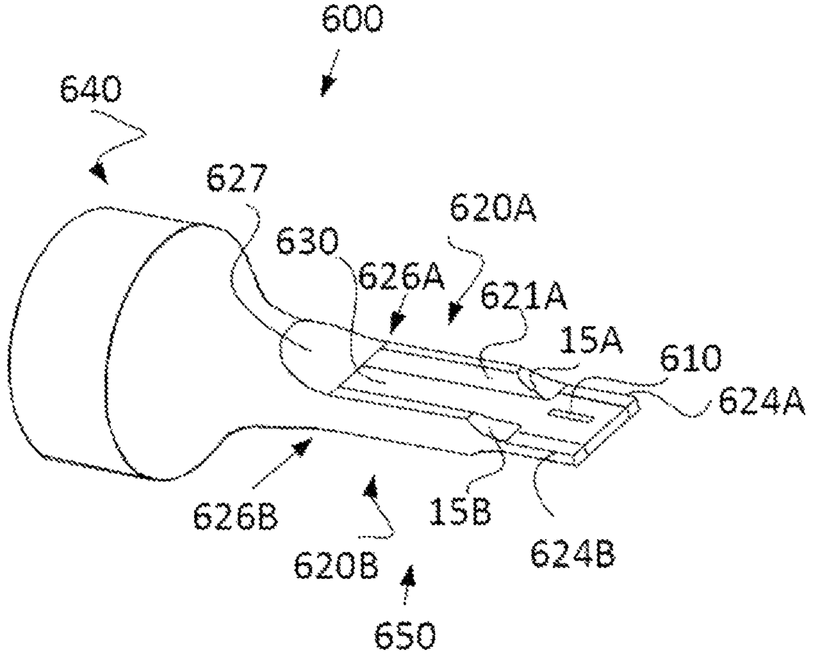
FIG. 6 is a perspective view of another example LED retrofit lamp.

FIG. 6 is a perspective view of an LED retrofit lamp 600 according to another example. The LED retrofit lamp 600 may include a heat sink body portion 640 and a bracket 650 supporting a substrate 630. A first LED package 610 comprising a first group of LED light emitters (not individually depicted) may be mounted on one side of substrate 630. A second LED package (not visible in FIG. 6) may be mounted on the other side of substrate 630 (not visible in FIG. 6). The first and second LED packages 610 may be mounted back to back. In that arrangement, the substrate 630 separates the back of the first LED package from the back of the second LED package by an actual distance that is substantially equal to the thickness of substrate 630.

The bracket 650 may include a first elongated bracket arm 620A and a second elongated bracket arm 620B extending from a cap portion 627 to define a longitudinal axis of the LED retrofit lamp 600 with a heat sink 640. The cap 627 may couple the bracket 650 to the heat sink 640. Proximal end portions of the first bracket arm 620A and the second bracket arm 620B may be configured to have a height that extends beyond the surface of the substrate 630. Distal end portions of first and second bracket arms 620A and 620B may have a height that is substantially the same as the thickness of substrate 630.

Because the distal end portions of the bracket arms have the same height as the substrate thickness, the bracket arms at the distal end portions may not project above the top surface of substrate 650 or below the bottom surface of substrate 650. Consequently, the apparent separation between the backs of back to back LED packages 610 will be substantially the same as the actual separation, which is the thickness of the substrate 650 in the region of the distal end portions. This may provide an illumination profile for the LED retrofit lamp 600 that is closer to that of a filament in a corresponding halogen lamp when compared to the illumination profile provided by the bracket 150 of retrofit lamp 100.

Curved sections 15A, 15B may be formed on a top surface of each bracket arm 620A and 620B. Likewise, curved sections (not visible in FIG. 6) may be formed on the bottom surfaces of each bracket arm 620A and 620B. The curved sections may slope downward from the tops of the proximal end portions of the first and second bracket arms so as to meet the corresponding distal end portions of the first and second bracket arms. The curved sections may form light-shaping openings at the distal end of LED retrofit lamp 600 through which light emitted by LED packages 610 may pass close to the plane of top and bottom surfaces of substrate 620.

Bracket arms 620A and 620B may be configured with respect to the LED packages 610 and the substrate 630 such that the light-shaping openings at the distal ends of the bracket arms align with light emitting portions at the sides of LED packages 610. When the LED retrofit lamp 600 is installed in a headlamp system of a vehicle, the light-shaping openings in the bracket arms may be at the top and bottom of the LED retrofit lamp 600. Light may propagate through the light-shaping openings to illuminate corresponding top and bottom segments of the reflector 800.

The bracket configuration described in detail above may provide an improved headlight beam when the LED retrofit lamp 600 is installed in a projector type headlight system in comparison to a headlight beam provided by, for example, the LED retrofit 100 shown in FIGS. 1-3 installed in a projector type headlight system.

Figure 7A:
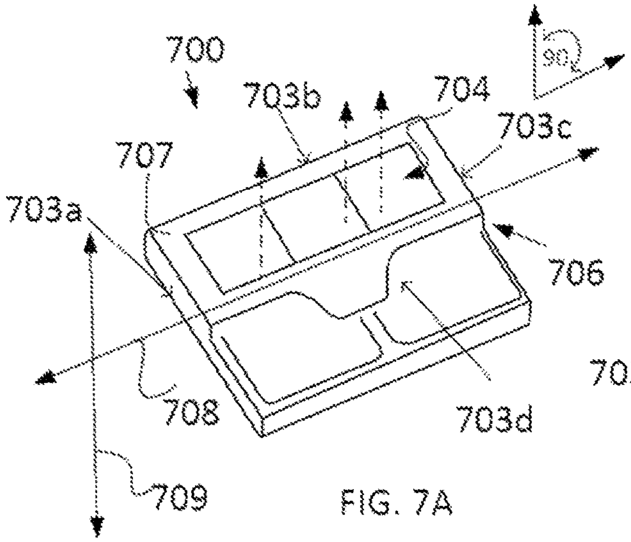
FIG. 7A is a perspective pictorial view of an example LED package.
Figure 7B:
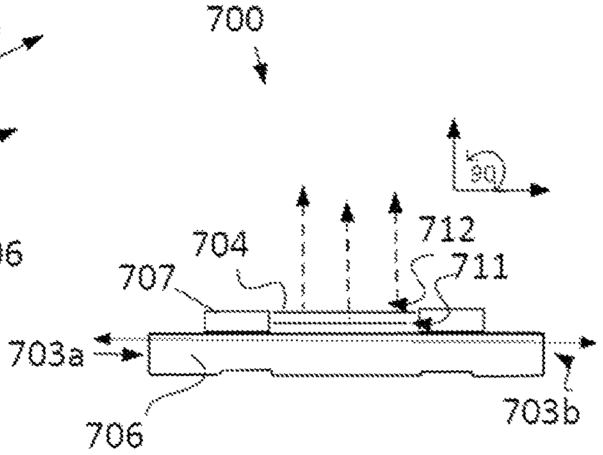
FIG. 7B is a pictorial side elevation view of the example LED package of FIG. 7A.

In some implementations, the LED retrofit lamp described above includes an LED light source configured to cooperate with any of the described bracket configurations such that the projected outline of the first and second group of LEDs in the back to back arrangement coincides closely with the projected contour of the filament in the corresponding halogen lamp when the LED retrofit lamp is installed in a projector type vehicle headlamp system, and when viewed normal to the top surfaces of the LEDs FIG. 7A is a perspective view of an LED package 700 configured for LED headlamp applications, and FIG. 7B is a side elevation view of the LED package 700. The LED package 700 generally includes an LED chip 711 emitting blue light disposed on an LED substrate 706 and covered with a phosphor layer 712 converting part of the blue light from the LED chip 711 to yellow light. The combined light output from the blue LED chip 711 with the converted yellow light from the phosphor layer 712 results in an emission of white light. This white light is particularly emitted from the top surface 704 of the phosphor layer 712. Such LED packages can include a side coating or other barrier 707 designed to block light emitted from the blue LED chip 711 and the phosphor layer 712 in a direction substantially perpendicular to the sides 703*a*, 703*b*, 703*c* and 703*d* of the LED substrate (i.e., in a direction substantially parallel to a horizontal axis 708 of LED package 700). The side coating encapsulates the sides of the blue LED chip 711, which may, for example, have a thickness of 0.1-0.2 mm and the phosphor layer 712 which can add another 0.1-0.2 mm thickness. The exposed phosphor surface 704 in the example of FIG. 7A is 3×an area of 1×1 $mm^2$.

The purpose of blocking the emission of light in or below the top surface plane 708 (i.e., blocking light emission parallel to a line normal to sides 703*a*, 703*b*, 703*c* and 703*d* is to support the optical (LED) headlamp designer by providing a light source having a high contrast between the light emitting part of a headlamp and the surrounding structural elements. Furthermore, such a side coating increases the amount of useful light available for the light emitting part of the headlamp and avoids stray light in the LED headlamp optics that are designed to use primarily the emission from the top surface of the LED package. This results in a sharp cutoff in the headlamp beam and avoids glare to oncoming traffic.

Figure 7C:
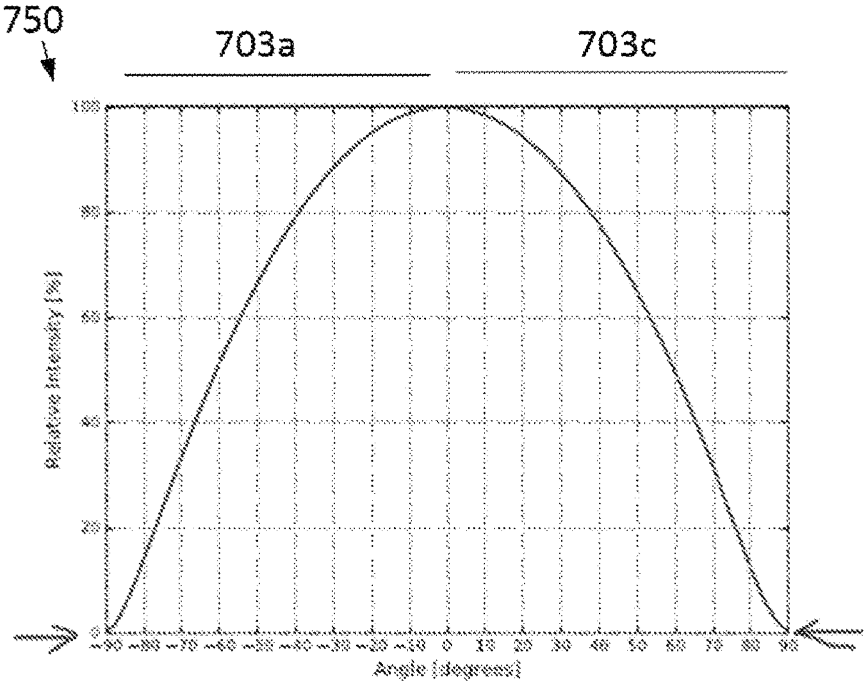
FIG. 7C is a luminous intensity diagram of the example LED package of FIG. 7A.

FIG. 7C is a luminous intensity diagram 750 showing an example luminous intensity of the LED package 700 at different angles of emission with respect to the vertical axis 709 of the LED package 700. The diagram shows the luminous intensity is 100% of the maximum at 0 degrees relative to the vertical axis 709 of the chip 700 and the luminous intensity is 0% of the maximum value at a +/−90 degree angle relative to the vertical axis 709 of chip 700 (i.e., parallel to the horizontal axis 708).

Figure 8A:
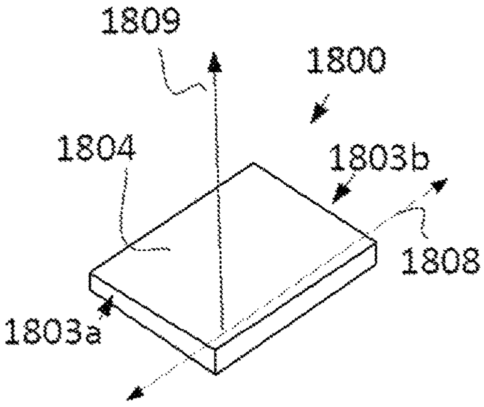
FIG. 8A is a perspective pictorial view of another example LED package.

FIG. 8A depicts an example LED package 1800. The LED package 1800 is configured to have a wider range of emission of light. In other words, the LED package 1800 is configured to emit light at some non-zero percentage of the maximum luminous intensity even at 90 degree angles with respect to the vertical axis 1809 of the LED package 1800. This can be achieved, for example, by applying phosphor around the top surface 1804 of chip 1800 and at edges of the LED package 1800. In this example approach the light emitted by the LEDs of chip 1800 can excite the phosphor coating at the top and edges so as to cloak the LED package 1800 in blue light. This achieves some significant emission of light to the side of the LED package, for example light emitted by ignition of the phosphors at the sides 1803*a* and 1803*b* of LED package 1800.

Figure 8B:
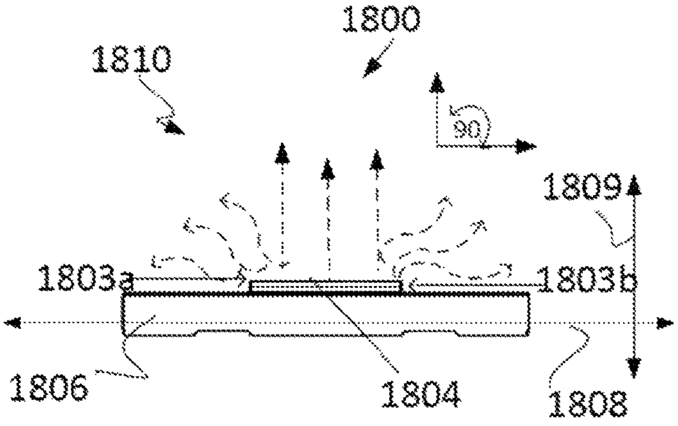
FIG. 8B is a pictorial side elevation view of the example LED package of FIG. 8A.

FIG. 8B is a pictorial side elevation view of the LED package 1800 disposed on a substrate 1806. Unlike the typical LED package 700 shown in FIG. 7A, the LED package 1800 does not have any coating or barrier at the sides 1803 to block light from propagating away from the sides 1803*a* and 1803*b*. Accordingly, in the configuration of FIGS. 8A and 8B, there is nothing to prevent light from propagating in a direction parallel to the horizontal axis 1808 or at small angles with respect to the horizontal axis 1808. FIG. 8B shows an example emission pattern 1810 with light propagating at small angles with respect to the horizontal plane defined by the top emitting surface of the LED 1800 (extending along the horizontal axis 1808), in other words, large angles with respect to the vertical axis 1809.

Figure 8C:
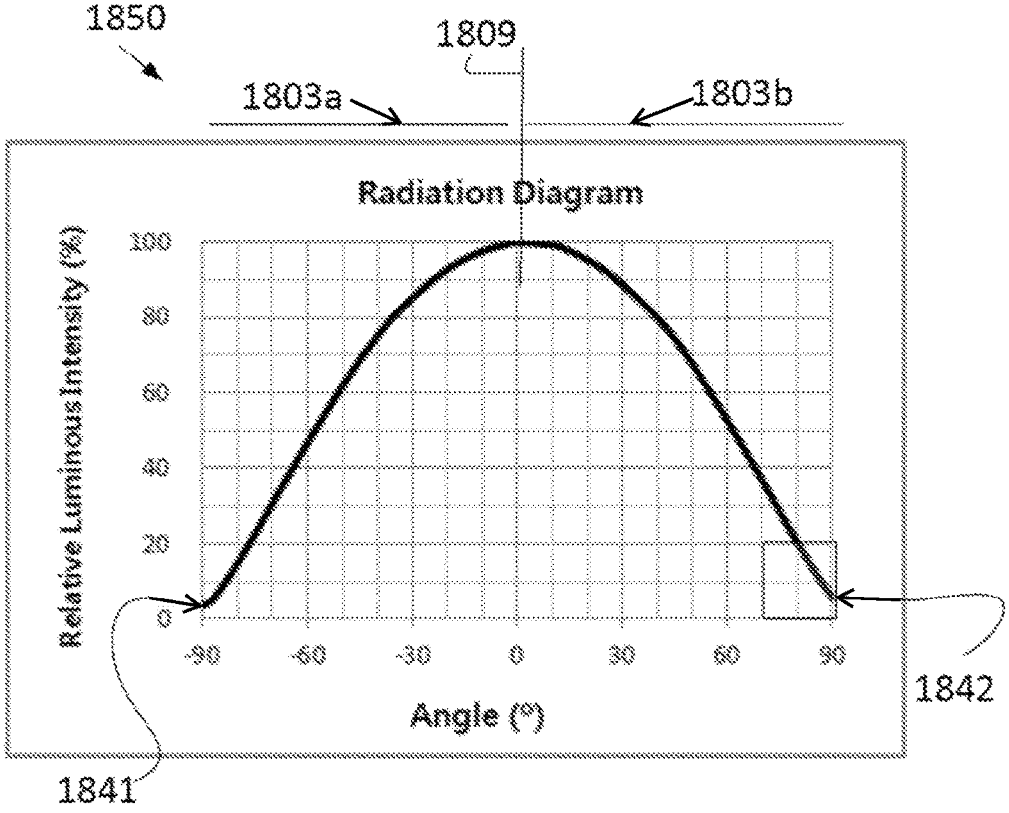
FIG. 8C is a luminous intensity diagram of the example LED package of FIG. 8A.

FIG. 8C is a luminous intensity diagram 1850 showing the luminous intensity of the LED package 1800 at different angles of emission with respect to the vertical axis 1809 in FIGS. 8A and 8B. The diagram shows luminous intensity 100% of maximum at 0 degrees with respect to a vertical axis 1809. In other words, light emitted substantially parallel to the vertical axis 1809 will have maximum luminous intensity. Significantly, light emitted from sides 1803*a* and 1803*b* at small angles with respect to the horizontal axis 1808 (large angles with respect to the vertical axis 1809) will have some luminous intensity (indicated at 1841). For example, light emitted at about −90 degrees with respect to the vertical axis 1809 has some luminous intensity (indicated at 1842). Likewise, light emitted at about +90 degrees with respect to the vertical axis 1809 will have some luminous intensity (indicated at 1842). In other words, light will be emitted with at least some luminous intensity in a direction roughly parallel to the horizontal axis 1808 and near the horizontal plane of the chip 1800. In one example of the LED 1800 shown in FIGS. 8A and 8B, the luminous intensity is roughly about 5% of maximum at 1841 (i.e., about −90 degrees with respect to the vertical axis 1809 and also at 1842, which is around +90 degrees with respect to the vertical axis 1809). However, this percentage could vary based on construction of the LED package. The important feature of the chip 1800 is emission of light sideway' so as to allow emitted light to propagate from chip 1800 at small angles with respect to horizontal axis 1808.

Embodiments described herein include an LED retrofit lamp including any of the LED brackets described herein equipped with the light source 1800 configured as described above. In these combinations of bracket and LED package 1800, the LED package is arranged with respect to openings in the bracket arms such that light can propagate sideways (i.e., away from the sides 1803*a* and 1803*b* of the LED package 1800 and through the corresponding openings in the bracket arms of the LED retrofit lamp bracket). The light propagates at angles close to (e.g., substantially parallel to) the horizontal plane in which the top surface of LED package 1800 lies. This allows illumination of top and bottom segments of reflector components of a projection headlamp system, thereby providing the top and bottom reflector components with light of sufficient intensity to project a headlight beam characterized by substantially homogenous light intensity. The bracket arms of the brackets described herein are configured to pass light propagating at these smaller angles while supporting and stabilizing the substrate with respect to the optical axis of the headlamp system.

FIGS. 9A and 9B show another type of LED 900. The LED package 900 can have a phosphor extending over the edges (e.g., 903*a*, 903*b*) of the LED chip (generating blue light) resulting in a smaller emission to the side than that of the LED 1800 shown in FIGS. 8A and 8B. However, the LED 900 has still relevant emission to the side (i.e., parallel to horizontal plane 903). FIG. 9B is a pictorial side elevation view of the LED package 900. Sides 903*a* and 903*b* of the LED package 900 are sufficiently free of a side coating or barrier that would block light propagating away from the sides 903*a* and 903*b*. In the configuration of FIGS. 9A and 9B, at least some light can propagate in a direction parallel to the horizontal axis 908 and at small angles relative to the horizontal axis 908. FIG. 9B shows an example emission pattern 910 in which light propagates at small angles relative to the horizontal axis 908 at the sides 903*a* and 903*b*.

FIG. 9C is a luminous intensity diagram 950 showing the luminous intensity of the LED package 900 at different angles of emission with respect to the vertical axis 909 in FIGS. 9A and 9B. The diagram shows luminous intensity 100% of maximum at 0 degrees with respect to a vertical axis 909. In other words, light emitted substantially parallel to the vertical axis 909 will have maximum intensity.

For example, as shown in FIGS. 9A and 9B, the luminous intensity is a small but non-zero percentage of maximum intensity at plus and minus 90 degrees with respect to the vertical axis 909, corresponding to emission away from the sides 903*a* and 903*b* in a direction parallel to the horizontal axis 908. In some examples, the luminous intensity is between about 1% and 3% maximum luminous intensity at about plus and minus 90 degrees with respect to the vertical axis 909. However, these percentages on either side could vary based on construction of the LED die and its packaging. The important feature of chip 900 is its configuration that allows some light to propagate at lower angles with respect to horizontal axis 908 from sides of LED 900.

Having described the embodiments in detail, those skilled in the art will appreciate that, given the present description, modifications may be made to the embodiments described herein without departing from the spirit of the disclosed concept. Therefore, it is not intended that the scope of the disclosure be limited to the specific embodiments illustrated and described, but the scope of protection is only limited by the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. An LED retrofit lamp for replacing a corresponding halogen lamp in a projection headlight system comprising a reflector comprising top, bottom, first side, and second side reflector segments and a lens, the LED retrofit lamp comprising;

a heat dissipating body portion;

a substrate comprising a first substrate surface separated by a distance from a second substrate surface to define longitudinal and lateral substrate sides, the distance defining a substrate height;

a first LED group mounted on the first surface and a second LED group mounted on the second surface;

a support bracket configured to engage the longitudinal substrate sides to mechanically support the substrate in alignment with a central optical axis of the reflector so that light emitted by the first and second LED groups normal to the first and second substrate surfaces illuminates the corresponding first and second side reflector segments, and light emitted parallel to the first and second reflector surfaces illuminates the corresponding top and bottom reflector segments with sufficient intensity for the lens to project a headlight beam with substantially homogenous light intensity.

2. The LED retrofit lamp of claim 1, wherein the first and second LED groups are on the respective first and second substrate surfaces at a position close to a position of a filament in the corresponding halogen lamp.

3. The LED retrofit lamp of claim 1, wherein the support bracket comprises first and second elongated bracket arms each bracket arm comprising a proximal arm part having an inner surface providing a first longitudinally extending slot to engage a respective longitudinal side of the substrate between the first and second bracket arms.to support a proximal end of the substrate.

4. The LED retrofit lamp of claim 3, wherein each of the first and second bracket arms comprises an elongated distal arm part having an arm height approximately equal to the height of the substrate such that light emitted parallel to the first and second surfaces illuminates the corresponding top and bottom reflector segments with sufficient intensity for the lens to project a headlight beam with substantially homogenous light intensity.

5. The LED retrofit lamp of claim 3, wherein each of the first and second bracket arms comprises an elongated distal arm part having an inner surface providing a second longitudinally extending slot to engage a respective longitudinal side of the substrate between the first and second bracket arms to support a distal end of the substrate.

6. The LED retrofit lamp of claim 5, wherein each of the first and second bracket arms comprises an intermediate arm part extending between the proximal arm part and the distal arm part, the intermediate arm part having an arm height approximately equal to the substrate height such that light emitted parallel to the first and second surfaces illuminates the corresponding top and bottom reflector segments with sufficient intensity for the lens to project a headlight beam with substantially homogenous light intensity.

7. The LED retrofit lamp of claim 5, wherein at least a portion of the LEDs comprising the first and second LED groups are configured to emit light sideways approximately in parallel with a lateral axis of the first and second surfaces.

8. The LED retrofit lamp of claim 1, wherein the first and second LED groups comprise corresponding first and second LED packages, each of the first and second LED packages configured to emit light at about 100 percent maximum luminous intensity in a direction away from the substrate and parallel to a vertical axis of the first and second LED packages, and to emit light with a luminous intensity greater than 0 percent at angles near 90 degrees from vertical axis and substantially parallel to a horizontal axis of the LED packages, such that the light emitted substantially parallel to the horizontal axis passes through corresponding openings in the bracket to illuminate the corresponding top and bottom reflector segments with sufficient luminous intensity for the lens to project a headlight beam with substantially homogenous luminous intensity.

9. The LED retrofit lamp of claim 8, wherein the first and second LED packages are configured to emit light in the direction substantially parallel to the horizontal axis at a relative luminous intensity of at least between about 1 percent and about 5 percent of maximum luminous intensity.

10. An LED retrofit lamp bracket for supporting a substrate within a projection headlight system, the substrate comprising: a first surface bearing a first LED group and a second surface bearing a second LED group, the first surface separated from the second surface so as to define longitudinal and lateral substrate sides, the distance defining a substrate height, and the projection headlight system comprising a reflector comprising top, bottom, first side, and second side reflector segments, the bracket comprising:

a cap portion coupling the substrate to a heat dissipating body; and first and second elongated bracket arms extending from the cap portion and configured to: engage the longitudinal sides of the substrate to mechanically support the substrate in alignment with a central optical axis of a reflector, pass light emitted by the first and second LED groups normal to the first and second surfaces to the reflector to illuminate the corresponding first and second side reflector segments, and pass light emitted parallel to the first and second surfaces to the reflector to illuminate the corresponding top and bottom reflector segments with sufficient intensity for the headlight system to form a headlight beam with substantially homogenous light intensity.

11. The LED retrofit lamp bracket of claim 10, wherein each of the first and second elongated bracket arms comprises an elongated proximal arm part having an inner surface providing a first longitudinally extending slot to engage a respective longitudinal side of the substrate between the first and second bracket arms to support a proximal end of the substrate.

12. The LED retrofit lamp bracket of claim 11, wherein each of the first and second bracket arms comprises an elongated distal arm part having an arm height approximately equal to the height of the substrate such that light emitted parallel to the first and second surfaces illuminates the corresponding top and bottom reflector segments with sufficient intensity for the headlight system to form a headlight beam with substantially homogenous light intensity.

13. The LED retrofit lamp bracket of claim 11, wherein each of the first and second bracket arms comprises an elongated distal arm part having an inner surface providing a second longitudinally extending slot to engage a respective longitudinal side of the substrate between the first and second bracket arms to support a distal end of the substrate.

14. The bracket of claim 13, wherein each of the first and second bracket arms comprises an intermediate arm part extending between the proximal arm part and the distal arm part, the intermediate arm part having an arm height approximately equal to the substrate height such that light emitted parallel to the first and second surfaces illuminates the corresponding top and bottom reflector segments with sufficient intensity for the headlight system to form a headlight beam with substantially homogenous light intensity.

15. The bracket of claim 10, wherein the first and second groups of LEDs are placed on the respective first and second surfaces at a position close to the position of a filament in the corresponding halogen lamp.

16. The bracket of claim 10, wherein at least a portion of the LEDs comprising the first and second LED groups are configured to emit light sideways approximately in parallel with a lateral axis of the first and second surfaces.

17. A projector headlamp system comprising:

a reflector comprising top, bottom, first side, and second side reflectors;

a lens optically aligned with the reflector and configured to form a headlight beam to illuminate an area in front of a vehicle;

an LED retrofit lamp coupled to the reflector and comprising:

a substrate comprising a first surface separated by a distance from a second surface to define longitudinal and lateral substrate sides, the distance defining a substrate height, a first LED group mounted on the first surface and a second LED group mounted on the second surface, and a support bracket configured to engage the longitudinal sides of the substrate to mechanically support the substrate in alignment with a central optical axis of the reflector so that light emitted by the first and second LED groups normal to the first and second surfaces illuminates the corresponding first and second side reflector segments, and light emitted parallel to the first and second surfaces illuminates the corresponding top and bottom reflector segments with sufficient intensity for the lens to form the headlight beam with substantially homogenous light intensity.

18. The projector headlamp system of claim 17, wherein the support bracket comprises first and second elongated bracket arms, each bracket arm comprising a proximal arm part having an inner surface providing a first longitudinally extending slot to engage a respective longitudinal side of the substrate between the first and second bracket arms.to support a proximal end of the substrate, and each bracket arm further comprising at least one arm part having a width approximately equal to the substrate width to define an opening light in each bracket arm through which light emitted parallel to the first and second surfaces can pass to illuminate the corresponding top and bottom reflector segments.

19. The projector headlamp system of claim 17, wherein the first and second LED groups comprise respective corresponding first and second LED packages, each LED package configured to emit light at substantially about 100 percent maximum relative luminous intensity in a direction away from the substrate and parallel to a vertical axis of the chip, and to emit light at substantially about 5 percent maximum relative luminous intensity in a direction away from sides of the first and second LED packages and substantially parallel to a horizontal axis of the chip such that light emitted at small angles relative to the horizontal axis of the chip will pass through a corresponding opening in a corresponding side of the bracket to illuminate the corresponding top and bottom reflectors with sufficient luminous intensity to enable the projector headlamp system to project a headlight beam with substantially homogenous luminous intensity.

20. The projector headlamp system of claim 19, wherein the first LED package and the second LED package are each coated with blue phosphorescent material over at least a portion of a top light emitting surface and at least some portions of edges of each chip so that light emitted by the LEDs comprising each chip ignites the phosphors to emit light the light at the small angles relative to the horizontal axis of each chip so as to illuminate the corresponding top and bottom reflectors with sufficient luminous intensity to enable the projector headlamp system to project a headlight beam with substantially homogenous luminous intensity.

* * * * *